United States Patent Office 3,796,763
Patented Mar. 12, 1974

3,796,763
PROCESS FOR THE PARTIAL HYDROGENATION OF DIPHENYL DERIVATIVES
Sigurt Hartung, Cologne-Mauenheim, Helmut Dierichs, Leverkusen, Wilhelm Müller, Schildgen, and Walter Schmidt, Leverkusen, Germany, assignors to Bayer Aktiengesellschaft, Leverkusen, Germany
No Drawing. Filed May 16, 1972, Ser. No. 253,710
Claims priority, application Germany, May 22, 1971, P 21 25 473.9
Int. Cl. C07c 5/10, 15/14
U.S. Cl. 260—667
15 Claims

ABSTRACT OF THE DISCLOSURE

Diphenyl derivatives and polynuclear compounds containing the diphenyl carbon skeleton are partially hydrogenated in the presence of a cobalt containing catalyst.

BACKGROUND

This invention relates to a new process for the partial hydrogenation of diphenyl derivatives and polynuclear compounds which contain the diphenyl carbon skeleton.

It is already known that diphenyl can be partially hydrogenated in the presence of catalysts, such as, Raney nickel, if the hydrogenation reaction is terminated after the quantity of hydrogen required by the stoichiometry has been absorbed [Eijkmann, Annales de Chimie et de Physique (9) 4, page 300]. The partial hydrogenation of terphenyl has also been described [D. A. Scola, J. Org. Chemistry 30 (1965) pages 384–388; Y. Bahurel, et al., Bull. de la Soc. Chim. de France (1968) 10, pages 4529–65]. However, partial hydrogenation can only be carried out under certain conditions which must be strictly observed because hydrogenation of the final aromatic ring begins without any noticeable step of the reaction velocity. Consequently, the final aromatic ring is already hydrogenated before all the starting material has reacted. Thus, even where the reaction conditions are strictly observed, considerable quantities of completely hydrogenated compounds can be detected in the reaction product. Accordingly, even slight changes in pressure and temperature are sufficient to cause the reaction to follow a different course and yield only completely hydrogenated products in addition to unchanged starting material. In addition, the presence of a solvent such as cyclohexane, is clearly essential if partial reduction is to be successfully carried out in the presence of Raney nickel.

Accordingly, diphenyl and aromatic compounds which contain the diphenyl carbon skeleton, such as terphenyl, fluorene, fluoranthene, pyrene or phenanthrene, which are available commercially from processing of coal tar (Fieser and Fieser, Organic Chemistry, 2nd ed., Reinhold Publishing Company, New York, pp. 564, 569), had not been expected to lend themselves to smooth hydrogenation reactions yielding end products which contain one aromatic carbon ring.

SUMMARY

Surprisingly, it has now been found that compounds of the general Formula I,

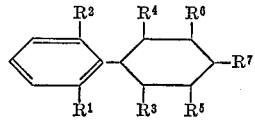

in which $R^1$ and $R^2$ are the same or different and each represents hydrogen, except they are part of a ring together with $R^3$ or $R^4$ respectively, in this case $R^1$ with $R^3$ or $R^2$ with $R^4$ respectively represent a methine-, methylene- or —$CH_2CH_2$-group; and/or $R^3$, $R^4$, $R^5$, $R^6$ and $R^7$ are the same or different and each represents a hydrogen atom or an aliphatic ring; and/or $R^3$ together with $R^5$, and/or $R^4$ together with $R^6$, represents a group which completes an aliphatic ring, which ring is optionally attached to $R^1$ or $R^2$ respectively so that the group formed by $R^1$ together with $R^3$ or by $R^2$ together with $R^4$ is a methine group;

can be obtained by hydrogenating compounds of the general Formula II,

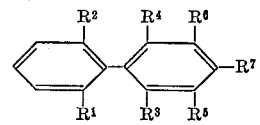

in which $R^1$ and $R^2$ are the same or different and each represents hydrogen, or $R^1$ with $R^3$ and/or $R^2$ with $R^4$ represent a bridging carbon atom or atoms or a —CH=CH-group or groups;
$R^3$, $R^4$, $R^5$, $R^6$ and $R^7$ are the same or different and each represents hydrogen or phenyl; or $R^5$ together with a bridging carbon atom represents by $R^1$ and $R^3$ together, bridging carbon atom represented by $R^1$ and $R^3$ together resented by $R^2$ and $R^4$ together form an anellated aromatic ring or rings preferably containing 6 carbon atoms;

under elevated pressure at temperatures of from 120° C. to 300° C. in the presence of a catalyst containing a cobalt oxide or a mixture of cobalt oxides.

DESCRIPTION

The reaction is preferably carried out at temperatures of from 150° C. to 200° C.

The hydrogenation reaction can be carried out either continuously or in batches, and may be carried out in solution. Examples of suitable solvents include hydrocarbons, such as cyclohexane, and chlorinated hydrocarbons, it is preferable to use a partially hydrogenated compound obtainable by the process according to the invention, especially where the reaction is carried out continuously.

The temperature at which the hydrogenation reaction begins is governed by the purity of the starting materials. The reaction temperature is generally somewhat higher normally lying in the range from 120° C. to 300° C., preferably in the range from 150° C. to 200° C.

The catalysts which may be used for the process according to the invention contain cobalt oxide or a mixture of cobalt oxides, such as a mixture of $Co_3O_4$ and $CoO$ which, according to X-ray structural analysis, contain from 5% to 15% of $CoO$ and from 85% to 95% of $Co_3O_4$. It is advantageous to add to the cobalt oxides from 0.01 to 0.1 mole percent of one or more metals which are more noble than cobalt, preferably metals of the First Secondary Group (copper, silver, gold) or of the Eighth Group of the Periodic Table of Elements, in particular the platinum metals. Palladium is particularly preferred.

It is also advantageous to alkalize the catalyst by treating it with salts of the alkali metals. The oxides, hydroxides, carbonates or bicarbonates of the alkali metals (such as lithium, sodium or potassium) are preferred for this purpose, sodium carbonate being particularly preferred. Alkalization can be carried out in different ways, for example, the catalyst can be thoroughly mixed with the calculated quantity by weight of alkali salts under dry conditions by a suitable technique, such as grinding. Another suitable method is to suspend the catalyst in a, for example, 15% by weight solution of the alkali salt and then filter the suspension under suction and dry the collected material without having washed it. This procedure may be repeated once or several times to obtain a desired degree of alkalization. Catalysts thus alkalized contain up to about 10% by weight, preferably up to 3% by weight of alkali metal based on the total weight of catalyst.

In addition, it can be of advantage in some cases to control the course of the hydrogenation reaction or the efficiency of the catalyst by the addition of further alkaline substances. Examples of alkaline substances which are preferred for this purpose include the carbonates, oxides and hydroxides of the alkali and alkaline earth metals, for example calcium oxide. These alkaline substances are used in a quantity of, for example, from 10 to 300% by weight, based on the quantity of catalyst.

Approximately 0.2 to 3 parts by weight of catalyst are used for 100 parts by weight of the substance to be hydrogenated. It is of course possible, instead of using fresh catalyst for each reaction to re-use a catalyst that has already been used and recovered or to employ a mixture of recovered catalyst and fresh catalyst in any ratio.

As already mentioned, the reaction may be carried out in the presence of a solvent. In this case, a preferred embodiment of the process is a continuous embodiment in which some of the hydrogenated product is recycled and used as a solvent for the starting material. The particular technical advantage of this embodiment is that the entire catalyst can be recycled with this stream of product and it use thus optimized. In addition, the starting materials for the process, which generally have extremely high melting points, dissolve particularly readily in this stream of the product which is kept at the reaction temperature.

One aspect which is particularly surprising in view of the prior art is the selective nature of the partial hydrogenation reaction whereby one aromatic ring always remains intact. Thus, for example, it is possible to hydrogenate diphenyl selectively at 200° C. under 150 atms. hydrogen pressure in the presence of 2% by weight of a catalyst based on diphenyl according to the invention and to obtain an end product, which, apart from the desired partially hydrogenated reaction product, cyclohexyl benzene, contains only traces of non-hydrogenated starting material (diphenyl) and only about 2% of the completely hydrogenated starting material (dicyclohexyl).

Isomers of terphenyl and hydrocarbons which contain the diphenyl carbon skeleton, such as fluorene, fluoranthene, pyrene and phenanthrene, can be hydrogenated with the same selectivity to give compounds which contain only one nonhydrogenated aromatic ring. In conventional processes hydrogenation cannot be carried out with such selectivity and it is necessary to monitor the course of the hydrogenation reaction and to terminate the reaction after the calculated quantity of hydrogen has been absorbed exactly, because the absorption of hydrogen will otherwise continue without any visible change in velocity until all the starting material had been completely hydrogenated. In contrast, the absorption of hydrogen in the process according to the invention ceases or clearly declines to a low rate when the starting material has been hydrogenated so that only one aromatic ring remains.

Accordingly, it is also possible to use the partially hydrogenated end product of the reaction as the solvent for the starting material.

The compounds which can be obtained by the process according to the invention are valuable intermediates for the production of dyes and textile auxiliaries. They may also be used for example, as heat-transfer agents, moderators in nuclear reactors or constituents of hydraulic oils and solvents. The physical data quoted in Examples 10 and 11 below demonstrate in particular their suitability for use as heat-transfer agents or hydraulic oils.

EXAMPLE 1

(a) A palladium (II) chloride solution is added to 1 liter of a cobalt (II) chloride solution containing approximately 150 g. of cobalt so that the palladium concentration is approximately 27 mg./liter. This corresponds to a molar ratio of palladium:cobalt of 0.01 to 100. 1 liter of a solution containing approximately 230 g. of oxalic acid is then run into this solution at a temperature of from 80 to 90° C. with continuous stirring. The pinkish-red, readily, filterable cobalt oxalate which contains 2 mols of water of crystallization is formed and is repeatedly decanated, filtered and dried. On heating to 250° C., the oxalate begins to decompose with smoldering into black cobalt oxide ($Co_3O_4$) and for increasing its activity this is subsequently suspended in a 15% soda solution and, without being washed, is filtered under suction until dry. A black powder of the alkalized cobalt oxide is obtained after further drying.

(b) 200 g. of diphenyl and 4 g. of the catalyst prepared as described above are introduced into a 700 ml.-capacity stainless steel hydrogenation autoclave. The hydrogenation reaction begins at 126° C. and is continued at a temperature rising to 150° C. under a hydrogen pressure of from 100 to 150 atms. The hydrogenation reaction is completed after 19 minutes.

The consumption of hydrogen during the reaction is followed and measured by the proportional drop in pressure and the addition of hydrogen required to compensate for this drop. A total of 220 atms. of hydrogen were absorbed as follows:

|  | Atms. |
|---|---|
| After 6 minutes | 100 |
| After another 3 minutes | 50 |
| After another 3 minutes | 50 |
| After the last 5 minutes | 20 |
|  | 220 |

According to gas chromatographic analysis, the reaction product consists of:

97.7% of cyclohexyl benzene;
2.3% of dicyclohexyl; and
less than 0.1% of diphenyl.

EXAMPLE 2

200 g. of diphenyl and the catalyst used in Example 1 and recovered by filtration are introduced into a 700 ml.-capacity stainless steel hydrogenation autoclave. The hydrogenation reaction begins at 150° C., and the temperature is then increased to and maintained at 180° C. The absorption of hydrogen is completed after 60 minutes. The consumption of hydrogen during the reaction is compensated by increases in pressure up to a maximum pressure of 150 atms., the pressure being increased as follows:

By 50 atms. of hydrogen during the first 10 minutes;
By a further 50 atms. of hydrogen up to the 25th minute;
By a further 50 atms. of hydrogen up to the 40th minutes;
By a further 50 atms. of hydrogen up to the 50th minute; and
By a further 30 atms. of hydrogen up to the 60th minute.

The reaction mixture is maintained at 180° C. under a hydrogen pressure of 150 atms. for another 10 minutes, although there is no further drop in pressure. Accordingly, a total of 230 atms. of hydrogen were absorbed.

According to gas chromatographic analysis the reaction product consists of:

98.1% of cyclohexyl benzene;
1.8% of dicyclohexyl; and
less than 0.1% of diphenyl.

EXAMPLE 3

1500 g. of diphenyl and 45 g. of the catalyst prepared as described in Example 1 are introduced into a 3000 ml. capacity autoclave. The hydrogenation reaction begins at 220° C. and is continued by increasing the temperature to 250° C. at a pressure of up to 150 atms.

In order to compensate for the drop in pressure resulting from absorption of hydrogen, the pressure is increased up to 150 atms. as follows:

By 100 atms. during the first 15 minutes;
By a further 100 atms. up to the 35th minute;
By a further 100 atms. up to the 55th minute; and
By a further 50 atms. of hydrogen up to the 70th minute.

Total hydrogen absorption: 350 atms.

In order to complete the hydrogenation, the temperature is maintained at 280° C. for 240 minutes during which no further appreciable absorption of hydrogen is observed.

According to gas chromatographic analysis, the reaction product consists of 98.1% of cyclohexyl benzene; 1.9% of dicyclohexyl; and less than 0.1% of diphenyl.

EXAMPLE 4

200 g. of o-terphenyl and 4 g. of the catalyst prepared as described in Example 1 are introduced into a 700 ml.-capacity stainless steel hydrogenation autoclave. The hydrogenation reaction begins at 116° C. and is continued by increasing the temperature to 200° C. at a pressure of 150 atms.

The reaction is completed after 29 minutes. In order to correct for the drop in pressure attributable to the consumption of hydrogen, the hydrogen pressure is increased up to 150 atms. as follows:

By 50 atms. during the first 6 minutes;
By a further 50 atms. during the next 4 minutes;
By a further 50 atms. during the next 3 minutes;
By a further 50 atms. during the next 6 minutes; and
By a further 30 atms. during the next 10 minutes.
Total hydrogen absorption: 230 atms.

The temperature is then maintained at 200° C. under 150 atms. hydrogen pressure for 10 minutes, although there is no further appreciable absorption of hydrogen.

After the catalyst has been filtered off, a colorless oil remains. In addition to 0.9% of first runnings the reaction product contains the three stereoisomeres of 2-phenyl dicyclohexyl in proportions of 19.8%, 64.7% and 14.6% respectively, according to gas chromatographic analysis.

Proof of configuration is supplied by the IR- and NMR-spectra which show that only monosubstituted benzene nuclei are present in the reaction product. Accordingly, the starting product o-terphenyl has been partially hydrogenated so that the remaining aromatic ring is situated at the end of a chain.

Spectroscopic data: NMR: 0.8–2.1 p.p.m. (20 H), 3.1 p.p.m. (1 H), 0.9–7.3 p.p.m. (5 H); IR: 697, 750 cm.$^{-1}$ (monosubstitution).

EXAMPLE 5

(a) A copper (II) chloride solution and a palladium (II) chloride solution are added to 1 liter of cobalt (II) chloride solution containing approximately 150 g. of cobalt so that the concentration of copper and palladium are approximately 16.5 mg./liter and 27 mg./liter, respectively. This corresponds to molar ratios of copper and palladium to cobalt of 0.01 and 0.01 to 10.

As described in Example 1, an oxalic acid solution is added to this mixture and the cobalt-palladium-copperoxalate mixture which is formed is worked up also as described in that example. The catalyst is then alkalized by impregnation with soda solution and dried as described in that example.

(b) 200 g. of m-terphenyl and 4 g. of the catalyst prepared as described above are introduced into a 700 ml.-capacity hydrogenation autoclave. The hydrogenation reaction begins at 116° C. and is continued with an increase in the temperature to 200° C. at a hydrogen pressure of 150 atms.

The hydrogenation time is 29 minutes. In order to compensate for the consumption of hydrogen and the accompanying drop in pressure, the hydrogen pressure is increased as follows:

By 50 atms. during the first 6 minutes;
By a further 50 atms. during the next 4 minutes;
By a further 50 atms. during the next 3 minutes;
By a further 50 atms. during the next 6 minutes; and
By a further 30 atms. during the next 10 minutes.
Total hydrogen absorption: 230 atms.

The reaction is then maintained at 200° C./150 atms. of hydrogen for 10 minutes during which there is no further appreciable absorption of hydrogen.

The reaction product obtained after the catalyst has been filtered off is liquid and crystal-clear. According to gas chromatographic analysis, it contains in addition to 0.4% of first runnings partially hydrogenated m-terphenyl.

Proof of configuration is supplied by the IR- and NMR-spectra.

Spectroscopic data: NMR: 0.9–2.0 p.p.m. (20 H), 2.2–2.7 p.p.m. (1 H), 6.9–7.2 p.p.m. (5 H); IR: 696, 752 cm.$^{-1}$ (monosubstitution), at 703, 790 cm.$^{-2}$ (weak), from which the product is assessed as:

70% of 3-dodecahydrodiphenylbenzene
30% of 1,3-dicyclohexyl benzene.

EXAMPLE 6

200 g. of p-terphenyl and 4 g. of the catalyst prepared as described in Example 1 are introduced into a 700 ml.-capacity hydrogenation autoclave. Hydrogenation begins at 93° C. and is continued with an increase in the temperature to 200° C. at 150 atms.

Hydrogenation is completed after 46 minutes. In order to compensate for the drop in pressure attributable to the consumption of hydrogen, the hydrogen pressure is increased as follows:

By 50 atms. during the first 10 minutes;
By a further 50 atms. during the next 8 minutes;
By a further 50 atms. during the next 8 minutes;
By a further 50 atms. during the next 10 minutes; and
By a further 20 atms. during the final 10 minutes.
Total hydrogen absorption: 220 atms.

The temperature is maintained at 200° C./150 atms. for 10 minutes during which there is no further appreciable absorption of hydrogen.

After the catalyst has been filtered off, a colorless liquid is initially obtained which solidifies on prolonged standing.

According to the IR- and NMR-spectra, the reaction product contains no compound with more than one aromatic ring.

Spectroscopic data: NMR: 7.1 p.p.m. (monosubstituted benzene), 3.2 p.p.m. (aliphatic-H, cis-trans isomers), 7.07 p.p.m. (singlet) p-disubstituted benzene; IR: 695, 750 cm.$^{-1}$ monosubstitution, 818 cm.$^{-1}$ p-disubstitution, from which the product is assessed as:

66% of 4-phenyldodecahydro-diphenyl
33% of 1,4-dicyclohexyl-benzene.

EXAMPLE 7

200 g. of fluorene, 6 g. of the catalyst prepared as described in Example 1 and 6 g. of calcium oxide are introduced into a 700 ml.-capacity hydrogenation autoclave. The hydrogenation reaction begins at 150° C. and is continued with an increase in temperature to 200° C. at from 150 to 200 atms. hydrogen pressure. After 25 minutes hydrogenation has progressed to such an extent that there is no further absorption of hydrogen.

The NMR-spectrum: 3.76 p.p.m. (according to Stadtler's reference spectrum 288). Absorption suggests a fluorene content less than 1%; 2.2–3.15 p.p.m. [protons on (aliphatic) tertiary carbon atoms].

It is apparent from the ratio between the aliphatic and the aromatic protons that one aromatic nucleus has been left unhydrogenated.

EXAMPLE 8

200 g. of fluoranthene, 6 g. of the catalyst prepared as described in Example 1 and 6 g. of calcium oxide are introduced into a 700 ml.-capacity hydrogenation autoclave. The hydrogenation reaction begins at 127° C. and is continued with an increase in the temperature to 140° C. at a maximum hydrogen pressure of 150 atms.

The reaction is completed after 105 minutes. In order to compensate for the drop in pressure attributable to the consumption of hydrogen, the hydrogen pressure is increased as follows:

By 50 atms. during the first 15 minutes;
By a further 50 atms. during the next 10 minutes;
By a further 50 atms. during the next 10 minutes;
By a further 50 atms. during the next 15 minutes;
By a further 50 atms. during the next 15 minutes;
By a further 50 atms. during the next 20 minutes; and
By a further 20 atms. during the next 20 minutes.
Total hydrogen absorption: 320 atms.

The reaction mixture is then held at 140° C./150 atms. for another 10 minutes although no further appreciable absorption of hydrogen is observed.

The NMR-spectrum of the reaction product filtered off from the catalyst shows that no starting material is present in the reaction product and further shows the absence of the naphthalene structure, but confirms the presence of an aromatic benzene ring, i.e. of a partially hydrogenated fluoranthene:

>7.5 p.p.m. no signal. Floranthene can be excluded with the aid of the comparison spectrum;
around 7.5 p.p.m. traces; no naphthalene structure;
2.8–3.2 p.p.m. protons on (aliphatic) tertiary carbon atoms (a), characteristic of isomers of partially hydrogenated fluoranthene.

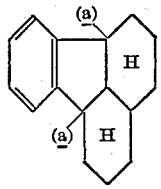

The remaining aliphatic absorption reveals only a minimal fraction of perhydrogenated fluoranthene.

EXAMPLE 9

135 g. of desulphurized phenanthrene, 6.5 g. of the catalyst prepared as described in Example 1 and 8 g. of calcium oxide are introduced into a 700 ml.-capacity hydrogenation autoclave. The hydrogenation reaction begins at 120° C. at a pressure of 100 atms. of hydrogen. The reaction is completed after 105 minutes. Any drop in the pressure is corrected to 100 atms. as follows:

By 100 atms. during the first 30 minutes;
By 80 atms. during the next 30 minutes; and
By 30 atms. during the final 45 minutes.

The temperature is then maintained at 130° C./150 atms. of hydrogen for another 10 minutes during which no further absorption of hydrogen is observed. The total absorption of hydrogen is thus 210 atms. After it has been filtered off from the catalyst, the reaction product is a clear liquid.

In addition to 2% of first runnings, two isomers of the hydrogenated phenanthrene can be detected by gas chromatography:

10.2% of unsymmetrical octahydrophenanthrene; and
87.8% of symmetrical octahydrophenanthrene.

EXAMPLE 10

(a) A catalyst containing palladium, copper and cobalt in a ratio of 0.01:0.01:100 is prepared as described in Example 5. The catalyst is alkalized by impregnation with soda solution, as described in Example 1, and then dried.

(b) 200 g. of a terphenyl sample comprising 9.2% of o-, 49.1% of m-, 29.2% of p-terphenyl; 0.5% of diphenyl; and 12% of higher polyphenyls are introduced into a 700 ml.-capacity hydrogenation autoclave. 4 g. of the catalyst prepared as described above and 4 g. of calcium oxide are then added. The reaction is completed after 23 minutes at 150–210° C./150 atms. of hydrogen. As described in Example 4, each drop in pressure is corrected by the introduction of hydrogen until there is no further appreciable absorption of hydrogen. The reaction product has a refractive index of $n_D^{22}=1.536$. In accordance with the table set out below, this suggests that 67% of the terphenyl was hydrogenated, in other words one benzene ring was not affected.

TABLE

Dependence of refractive index upon degree of hydrogenation

| Degree of hydrogenation (percent): | $n_D^{22}$ |
|---|---|
| 10 | 1.620 |
| 20 | 1.600 |
| 40 | 1.559 |
| 60 | 1.541 |
| 67 | 1.536 |
| 80 | 1.526 |
| 100 (perhydroterphenyl) | 1.512 |

Other physical data for the reaction product are set out as follows:

| | |
|---|---|
| Boiling range ° C. | 346–360 |
| Maximum service temperature as heat-transfer agent under permanent load ° C. | 340 |
| Vapor pressure at the service temperature (less than—atms.) | 1.0 |
| Pour point ° C. | −37 |
| Density at 20° C. g./cc. | 0.98 |
| Ignition temperature ° C. | 370 |
| Flashpoint ° C. | 183 |
| Viscosity at 0° C. cst. | 324 |
| Viscosity at 20° C. cst. | 53 |
| Viscosity at 50° C. cst. | 12.1 |
| Viscosity at 100° C. cst. | 3.4 |

The adiabatic compressibility and the figures for conventional mineral oil and water quoted for comparison are as follows:

[Unit: $10^{-12}$cm.$^2$/dyne]

| | Reaction product | Mineral oil | Water |
|---|---|---|---|
| Temperature: | | | |
| 20° C. | 38.7 | 53.1 | 47.0 |
| 40° C. | 42.7 | 59.8 | 45.3 |
| 60° C. | 47.3 | 66.2 | 45.0 |
| 80° C. | 52.6 | 72.4 | 45.7 |

EXAMPLE 11

200 g. of a terphenyl sample of the following composition: 59.4% of m-terphenyl; 39.7% of p-terphenyl; and 0.9% of higher polyphenyls, are hydrogenated at 150–200° C. under 150 atms. of hydrogen in the presence of a catalyst which was prepared as described in Example 5 and alkalized as described in Example 1, and 4 g. of calcium oxide. Hydrogenation takes place as described in Example 5, each drop in pressure being corrected to 150 atms. by introducing hydrogen. After 23 minutes, no more hydrogen is absorbed. The total hydrogen absorption is 230 atms. After filtration, the reaction product has a refractive index $n_D^{22}=1.538$. According to the table set out in Example 10, this corresponds to a degree of hydrogenation of 65%, i.e. one benzene ring has not been hydrogenated.

Physical data for the reaction product:

| | |
|---|---|
| Boiling range ° C | 349.5–360 |
| Flashpoint ° C | 185 |
| Viscosity at 0° C cst | 385 |
| Viscosity at 20° C cst | 58 |
| Viscosity at 50° C cst | 12.3 |
| Viscosity at 100° C cst | 3.4 |
| Ignition temperature in air ° C | 370 |
| Burning-point ° C | 193 |
| Pour-point ° C | −32 |
| Average specific heat at 20° C. Kcal./kg. ° C | 0.36 |

What is claimed is:

1. Process for preparing compounds having the Formula I:

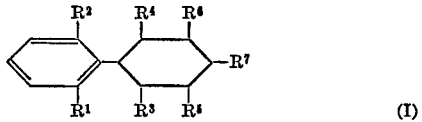

(I)

wherein $R^1$ and $R^2$ are the same or different and each represents hydrogen, except they are part of a ring together with $R^3$ or $R^4$ respectively, in this case $R^1$ with $R^3$ or $R^2$ with $R^4$ respectively represent a methenyl, methylene- or —$CH_2CH_2$-group; and/or $R^3$, $R^4$, $R^5$, $R^6$ and $R^7$ are the same or different and each represents a hydrogen atom or a hydrocarbon ring; and/or $R^3$ together with $R^5$, and/or $R^4$ together with $R^6$, represents a group which completes a hydrocarbon ring, which ring is optionally attached to $R^1$ or $R^2$ respectively so that the group formed by $R^1$ together with $R^3$ or by $R^2$ together with $R^4$ is a methenyl group, said hydrocarbon ring or rings which may be represented by $R^3$, $R^4$, $R^5$, $R^6$ or $R^7$ in Formula I having 6 carbon atoms in the ring, which comprises hydrogenating compounds having the Formula II:

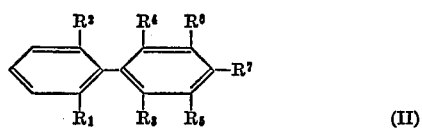

(II)

wherein $R^1$ and $R^2$ are the same or different and each represents a hydrogen atom, or together with $R^3$ or with $R^4$ respectively represents a bridging carbon atom or a —CH=CH-group; and/or $R^3$, or $R^4$, $R^5$, $R^6$ and $R^7$ are the same or different and each represents a hydrogen atom or phenyl and/or $R^5$ together with the bridging carbon atom formed by $R^1$ and $R^3$ together, and/or $R^6$ together with the bridging carbon atom formed by $R^2$ and $R^4$ together, represent a group which completes an annellated aromatic ring, by reacting said Formula II compounds with hydrogen in contact with a catalyst consisting essentially of cobalt oxide.

2. Process of claim 1 wherein said catalyst consists essentially of a mixture of cobalt oxides.

3. Process of claim 1 wherein aliphatic ring or rings which may be completed by a group or groups represented by $R^3$ together with $R^5$, and/or $R^4$ together with $R^6$, in the compound of the general Formula I have 6 carbon atoms in the ring.

4. Process of claim 1 wherein $R^6$ together with the bridging carbon atom represented by $R^2$ and $R^4$ together in the compound of the general Formula II complete an annellated aromatic ring having 6 carbon atoms in the ring.

5. Process of claim 1 wherein the catalyst contains $Co_3O_4$ and/or CoO.

6. Process of claim 1 wherein the catalyst comprises a mixture of cobalt oxides comprising from 5 to 15% of CoO and from 85 to 95% of $Co_3O_4$.

7. Process of claim 1 wherein the catalyst additionally contains from 0.01 to 0.1 mole percent, based on cobalt, of one or more metals selected from the group of Group VIII metals, copper, silver and gold.

8. Process of claim 7 wherein the metal is selected from the group of copper, silver, gold and a platinum metal.

9. Process of claim 8 wherein the platinum metal is palladium.

10. Process of claim 1 wherein the catalyst is alkalized before use so as to contain up to about 10% by weight of alkali metal based on the total weight of catalyst.

11. Process of claim 1 wherein from 0.2 to 3 parts by weight of catalyst are used per 100 parts by weight of the compound of the general Formula II to be hydrogenated.

12. Process of claim 1 wherein the hydrogenation is carried out at a temperature of from 120° to 300° C.

13. Process of claim 1 wherein the hydrogenation is carried out at an elevated pressure up to about 150 atms. hydrogen pressure.

14. Process of claim 1 wherein the hydrogenation is carried out in the presence of a solvent selected from the group of hydrocarbon and chlorinated hydrocarbon solvents.

15. Process of claim 14 wherein the solvent is the compound of the general Formula I which is produced by the process.

References Cited
UNITED STATES PATENTS

| | | | |
|---|---|---|---|
| 3,130,237 | 4/1964 | Wald | 260—667 |
| 3,412,174 | 11/1968 | Kroll | 260—683.9 |
| 3,153,678 | 10/1964 | Logemann | 260—667 |
| 3,409,681 | 11/1968 | Kroll | 260—667 |
| 3,439,054 | 4/1969 | Kroll | 260—667 |
| 3,099,618 | 7/1963 | Gardner et al. | 252—466 B |
| 3,459,657 | 8/1969 | Kronig | 252—466 J |
| 3,032,515 | 5/1962 | Hinsvark | 252—466 J |
| 2,911,357 | 11/1959 | Myers et al. | 252—466 B |
| 3,657,156 | 4/1972 | Stander | 252—466 J |

DELBERT E. GANTZ, Primary Examiner

V. O'KEEFE, Assistant Examiner

U.S. Cl. X.R.
252—466 B, 466 J

UNITED STATES PATENT OFFICE
CERTIFICATE OF CORRECTION

Patent No. 3,796,763          Dated March 12, 1974

Inventor(s) Sigurt Hartung et al.

It is certified that error appears in the above-identified patent and that said Letters Patent are hereby corrected as shown below:

Column 2, line 25 delete "bridging carbon atom represents by $R^1$ and $R^3$ together,";

Column 2, line 26 "$R^I$" should read --$R^1$--;

Column 2, line 26, after "together" insert --and/or $R^6$ together with a bridging carbon atom represented--;

Column 2, line 27 delete "resented".

Column 4, line 5 delete comma(,) after "readily".

Signed and sealed this 17th day of September 1974.

(SEAL)
Attest:

McCOY M. GIBSON JR.
Attesting Officer

C. MARSHALL DANN
Commissioner of Patents